United States Patent Office 3,784,653
Patented Jan. 8, 1974

3,784,653
THIOL- OR THIONOTHIOL-PHOSPHORIC OR -PHOSPHONIC ACID ESTERS
Gerhard Schrader, Wuppertal-Cronenberg, and Ingeborg Hammann, Cologne, Germany, assignors to Bayer Aktiengesellschaft, Leverkusen, Germany
No Drawing. Filed Aug. 19, 1970, Ser. No. 65,323
Claims priority, application Germany, Sept. 10, 1969,
P 19 45 700.2
Int. Cl. A01n *9/36*; C07f *9/16, 9/40*
U.S. Cl. 260—929    5 Claims

ABSTRACT OF THE DISCLOSURE

Thiol- or thionothiolphosphoric or phosphonic acid esters, e.g. bis-O,O-dialkyl thiolphosphoric or bis-O-alkyl-alkanethiol phosphonic acid esters of halomethyl-1-halo-isopropylthioether and their thiono analogues, wherein the alkyl groups are lower alkyl and are optionally halogen-substituted, which possess arthropodicidal, especially acaricidal and insecticidal, properties and which may be produced by conventional methods.

The compounds have the formula

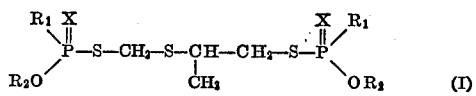

(I)

wherein $R_1$ is an optionally halogen-substituted lower alkyl or alkoxy radical,
$R_2$ is an optionally halogen-substituted lower alkyl radical, and
X is an oxygen or sulfur atom.

---

The present invention relates to and has for its objects the provision of particular thiol- or thionothiol phosphoric or phosphonic acid esters, e.g. bis-O,O-dialkyl thiolphosphoric or bis-O-alkyl-alkanethiol phosphonic acid esters of halomethyl-1-halo-isopropylthioether and their thiono analogues, wherein the alkyl groups are lower alkyl and are optionally halogen-substituted, which possess arthropodicidal, especially acaricidal and insecticidal, properties, active compositions in the form of mixtures of such compounds with solid and liquid dispersible carrier vehicles, and methods for producing such compounds and for using such compounds in a new way especially for combating pests, e.g. arthopods, especially insects and acarids, with other and further objects becoming apparent from a study of the within specification and accompanying examples.

In U.S. patent specification 1,949,629 there is described the reaction of 1,2-dichloroethane with the ammonium salt of O,O-diisopropylthionothiolphosphoric acid, in which O,O - diisopropyl-S-(2-chloroethyl)-thionothiolphosphoric acid ester is said to be formed in the first reaction step. The isolation, or preparation in pure form, of this hypothetical intermediate product is, however, not disclosed.

According to the particulars given in U.S. patent specification 2,266,514, the compound is said to be obtained by reaction of equimolar amounts of the aforesaid starting materials, but details in regard to purity and yields of the product are lacking.

Finally, from German patent specification 1,005,058, it is known that symmetric 1,2-dihaloethanes, e.g. dichloro- or dibromo-ethane, in general react with O,O-dialkylthiol or thionothiolphosphoric acid salts, with the exchange of both halogen atoms for the thiolphosphoric acid radical. A selective substitution of the halogen atoms is successful, according to the particulars given in the German patent specification cited above, in the case of the reaction with O,O-dialkylthionothiolphosphoric acid salts only when the work is carried out in aqueous solution, while the reaction with the salts of the appropriate thiolphosphoric acids leads to the desired successful result only when methyl-ethyl ketone is used as solvent.

The present invention provides thiol- or thionothiol-phosphoric or -phosphonic acid esters of the general formula

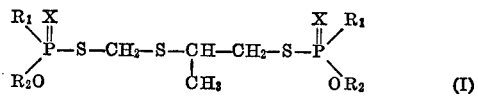

(I)

in which $R_1$ is an optionally halogen-substituted lower alkyl or alkoxy radical,
$R_2$ is an optionally halogen-substituted lower alkyl radical, and
X is an oxygen or sulfur atom.

The invention also provides a process for the production of a compound of Formula I in which a thiol- or thionothiolphosphoric (-phosphonic) acid salt of the general formula

(II)

is reacted with a halomethyl-1-haloisopropyl thioether of the general formula

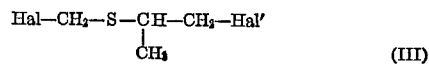

(III)

in which $R_1$, $R_2$ and X have the same meanings as above,
M is a monovalent metal equivalent or an ammonium group, and
Hal and Hal' (which may be the same or different) are chlorine or bromine atoms.

Surprisingly, the new compounds, compared with the active compounds of analogous constitution and the same direction of activity known from the literature, are distinguished by a substantially better effectiveness with in some cases considerably lower toxicity to warm-blooded animals. They therefore represent a genuine enrichment of the art.

The course of the process can be represented by the following reaction scheme:

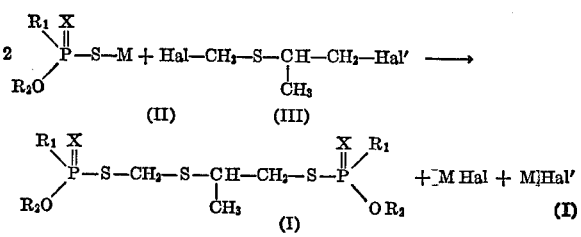

wherein $R_1$, $R_2$, X, M, Hal and Hal' have the meanings given above.

Preferably, $R_1$ is an optionally halogen-substituted lower alkyl or alkoxy radical with 1-4 carbon atoms, such as a methyl, methoxy, ethyl, ethoxy, β-chloroethoxy, β-chloroethyl, β,β,β-trichloroethoxy, n- and iso-propyl, n- and iso-propoxy, n-, iso- and sec.-butyl and n-, iso- and sec.-butoxy radical; $R_2$ is an optionally halogen-substituted lower alkyl group with 1 to 4 carbon atoms, e.g. methyl, ethyl, β-chloroethyl, β,β,β-trichloroethyl, n- and iso-propyl, n-, iso- and sec.-butyl, $R_1$ and $R_2$ possibly being the same or different; M is an alkali metal (especially potassium or sodium) ion or an ammonium group; Hal is chlorine and Hal' is bromine.

The halomethyl-1-haloisopropyl thioethers of the general Formula III required as starting materials are readily available even on an industrial scale, for example in the following manner:

Propylene sulfide is converted into the appropriate 1-haloisopropylmercaptan with the aid of concentrated hydrochloric or hydrobromic acid (cf. "Houben-Weyl, Die Methoden der organischen Chemie," 4th Edition, vol. IX, page 160) e.g.:

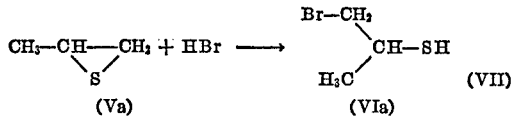

The bromoisopropylmercaptan can subsequently be reacted according to known methods by means of formaldehyde and halogen hydride, preferably hydrogen chloride, according to Equation VIII to give the desired halomethyl-1-bromo-isopropylthioether:

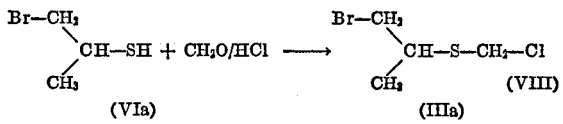

The process of the invention for the preparation of the compounds of Formula I is preferably carried out in the presence of a solvent which term includes a mere diluent. As such, practically all organic solvents inert to the reactants are suitable. These include optionally chlorinated hydrocarbons, such as benzine, benzene, toluene, xylene and chlorobenzene; ethers, for example diethyl ether and dibutyl ether, dioxane and tetrahydrofurane; and alcohols, such as methanol, ethanol, n- and iso-propanol. Particularly good results have been obtained with low-boiling aliphatic ketones or nitriles, such as acetone, methylethyl ketone, methylisobutyl ketone, methylisopropyl ketone, acetonitrile and propionitrile.

The reaction may be carried out within a fairly wide temperature range. In general, the reaction is carried out at 0 to 100° C. or the boiling point of the mixture, preferably at 20 to 70° C.

According to the Equation IV stated above, 2 moles of thiol- or thionothiol-phosphoric (-phosphonic) acid salt are needed per mole of halomethyl-1-haloisopropyl thioether. Expediently, a mixture of (thiono) thiolphosphoric or thiolphosphonic acid salt and one of the above-mentioned solvents, preferably acetonitrile, is provided, and the halomethyl-1-bromoisopropyl thioether is added dropwise to this mixture. After completion of the addition, in order to complete the reaction, the reaction mixture is stirred for a further 1 to 4 hours, optionally with slight heating and then cooling to room temperature. The working up of the mixture may take place in customary manner by pouring the mixture out into water, taking up the reaction product which separates out in oily form in one of the above-mentioned hydrocarbons, preferably benzene, washing and drying the organic phase and evaporating the solvent.

The new compounds are obtained in most cases in the form of colorless to slightly yellow-colored, water-insoluble oils which, even under greatly reduced pressure, cannot be distilled without decomposition.

The thiol- or thionothiol-phosphoric or -phosphonic acid esters are distinguished by outstanding insecticidal, including soil-insecticidal and acaricidal, properties, with in some cases extremely low phytotoxicity. The products are therefore suitable for use in plant protection and in the protection of stored products, as well as in the hygiene field, for the control of noxious sucking and biting insects, Diptera and mites (Acari).

To the sucking insects there belong, in the main aphids (Aphidae) such as the green peach aphid (*Myzus persicae*), the bean aphid (*Doralis fabae*), the bird cheery aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrate*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects, above all there should be mentioned butterfly caterpillars (Lepidoptera) such as the diamond-back moth (*Plutella maculipennis*), the gypsy moth (*Lymantria dispar*), the brown-tailed moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects are beetles (Coleoptera), for example the granary weevil (*Sitophilus granarius=Calandra granaria*), the Colorado beetle (*Leptinotarsa decemlineata*), the dock bettle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius= Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*); the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*, Oriental cockroach (*Blatta orientalis*), the giant cockroach (*Blaberus giganteus*) and the black giant cockroach (*Blaberus fuscus*) as well as *Henschoutedenia flexivitta*; further, Orthoptera for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), the blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against household pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test:
Solvent: 3 parts by weight actone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

TABLE 1
Plutella test

| Active compound (constitution) | Concentration of active compound in percent | Degree of destruction in percent after 3 days |
|---|---|---|
| $(CH_3O)_2\overset{O}{\overset{\|}{P}}-S-CH_2-CH_2-S\ C_2H_5$ (Known) (A) | 0.1<br>0.02 | 100<br>0 |
| $(CH_3O)_2\overset{S}{\overset{\|}{P}}-S-CH_2-S-\underset{\underset{CH_3}{\|}}{CH}-CH_2-S-\overset{S}{\overset{\|}{P}}(OCH_3)_2$ (1) | 0.1<br>0.02 | 100<br>100 |
| $(C_2H_5O)_2\overset{S}{\overset{\|}{P}}-S-CH_2-S-\underset{\underset{CH_3}{\|}}{CH}-CH_2-S-\overset{S}{\overset{\|}{P}}(OC_2H_5)_2$ (2) | 0.1<br>0.02 | 100<br>100 |

EXAMPLE 2

Ceratitis test:
Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

2 cc. of the preparation of the active compound are pipetted on to a filter paper disc of about 10 cm. diameter. This is placed on a glass in which there are about 30 fruit flies (*Ceratitis capitata*) and covered with a glass plate.

After the specified periods of time, the destruction is determined as a percentage. 100% means that all the flies were killed; 0% means that none of the flies were killed.

The active compounds, the concentrations of the active compounds, the evaluation times and the results can be seen from Table 2.

EXAMPLE 3

Tetranychus test:
Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

TABLE 2
Ceratitis test

| Active compound (constitution) | Concentration of active in percent compound | Degree of destruction in percent after 24 hours |
|---|---|---|
| $(CH_3O)_2\overset{O}{\overset{\|}{P}}-S-CH_2-CH_2-S\ C_2H_5$ (Known) (A) | 0.1<br>0.02<br>0.004 | 100<br>80<br>0 |
| $(CH_3O)_2\overset{S}{\overset{\|}{P}}-S-CH_2-S-\underset{\underset{CH_3}{\|}}{CH}-CH_2-S-\overset{S}{\overset{\|}{P}}(OCH_3)_2$ (1) | 0.1<br>0.02<br>0.004 | 100<br>100<br>100 |
| $(C_2H_5O)_2\overset{S}{\overset{\|}{P}}-S-CH_2-S-\underset{\underset{CH_3}{\|}}{CH}-CH_2-S-\overset{S}{\overset{\|}{P}}(OC_2H_5)_2$ | 0.1<br>0.02<br>0.004<br>0.0008 | 100<br>100<br>100<br>95 |

The active compounds, the concentrations of the active compounds, the evaluation times and the results can be seen from the following Table 3.

sium O,O-diethylthionothiolphosphate in 400 ml. of acetonitrile there are added at 40° C., with stirring, 61 g. of chloromethyl-1-bromoisopropyl thioether; the mixture is TABLE 3
Tetranchyus test

| Active compound (constitution) | | Concentration of active compound in percent | Degree of destruction in percent after 2 days |
|---|---|---|---|
| $(CH_3O)_2\overset{O}{\underset{\|}{P}}-S-CH_2-CH_2-SC_2H_5$ (Known) | (A) | 0.1<br>0.02 | 98<br>0 |
| $(C_2H_5O)_2\overset{S}{\underset{\|}{P}}-S-CH_2-S-\underset{\underset{CH_3}{\|}}{CH}-CH_2-S-\overset{S}{\underset{\|}{P}}(OC_2H_5)_2$ | (2) | 0.1<br>0.02<br>0.004 | 100<br>100<br>60 |

The following further examples are set forth to illustrate, without limitation, the process for producing the active compounds according to the present invention.

EXAMPLE 4

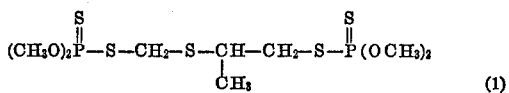

$(CH_3O)_2\overset{S}{\underset{\|}{P}}-S-CH_2-S-\underset{\underset{CH_3}{\|}}{CH}-CH_2-S-\overset{S}{\underset{\|}{P}}(OCH_3)_2$  (1)

0.3 molar mixture: 120 g. of potassium O,O-dimethylthionothiolphosphate are suspended in 300 ml. of acetonitrile. To this suspension there are added at 30 to 40° C., with stirring, 61 g. of chloromethyl-1-bromoisopropyl thioether. The reaction mixture is subsequently heated to 40 to 60° C. for a further 2 hours. The mixture is then poured into 300 ml. of ice water. The organic phase is taken up in 300 ml. of benzene, the benzene solution is separated, washed with ice water, dried over sodium sulfate and, finally, the solvent is distilled off under reduced pressure. The residue is treated for a short time at a bath temperature of 80° C. and a pressure of 0.1 mm. Hg.

In this manner there are obtained 90 g. (75% of the theory) of the bis-O,O-dimethyl-thionothiolphosphoric acid ester of hydroxymethyl-thio-(1-hydroxymethyl)-ethane of the above formula as a pale yellow, water-insoluble oil.

Calculated for $C_8H_{20}O_4P_2S_5$ (molecular weight 402) (percent): S, 39.8; P, 15.4. Found (percent): S, 39.6; P, 15.1.

EXAMPLE 5

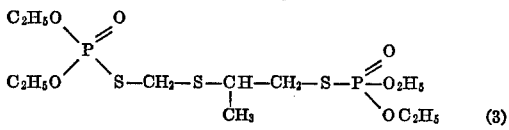

$\underset{C_2H_5O}{\overset{C_2H_5O}{\diagdown}}\overset{O}{\underset{\diagup}{P}}\diagdown S-CH_2-S-\underset{\underset{CH_3}{\|}}{CH}-CH_2-S-\overset{O}{\underset{\diagup}{P}}\underset{OC_2H_5}{\overset{O_2H_5}{\diagdown}}$  (3)

0.3 molar mixture: 115 g. of ammonium O,O-diethylthiolphosphate are suspended in 400 ml. of acetonitrile and to this suspension there are added at 40° C., with stirring, 61 g. of chloromethyl-1-bromoisopropyl thioether. The reaction mixture is then heated to 60° C. for two hours. Subsequently, the mixture is worked up as described in Example 4. In this manner, 100 g. (78% of the theory) of bis-O,O-diethylthiolphosphoric acid ester of hydroxymethyl-thio-(1-hydroxymethyl)-ethane of the above Formula 3 are obtained in the form of a colorless, water-insoluble oil.

Calculated for $C_{12}H_{28}O_6P_2S_3$ (molecular weight 426) (percent): S, 22.5; P, 14.5. Found (percent): S, 22.7; P, 14.1.

EXAMPLE 6

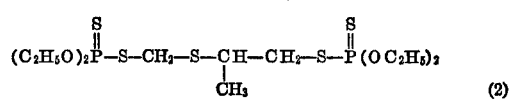

$(C_2H_5O)_2\overset{S}{\underset{\|}{P}}-S-CH_2-S-\underset{\underset{CH_3}{\|}}{CH}-CH_2-S-\overset{S}{\underset{\|}{P}}(OC_2H_5)_2$  (2)

0.3 molar mixture: To a suspension of 135 g. of potassium O,O-diethylthionothiolphosphate in 400 ml. of acetonitrile there are added at 40° C., with stirring, 61 g. of chloromethyl-1-bromoisopropyl thioether; the mixture is subsequently heated to 60° C. for 2 hours and it is then worked up as in Example 4. 108 g. (79% of the theory) of the bis-O,O-diethylthionothiolphosphoric acid ester of hydroxymethyl-thio-(1-hydroxymethyl)-ethane of the above Formula 2 are obtained as a pale-yellow, water-insoluble oil.

Calculated for $C_{12}H_{28}O_4P_2S_5$ (molecular weight 458) (percent): S, 13.4; P, 34.8. Found (percent): S, 13.2; P, 35.0.

The chloromethyl-1-bromoisopropyl ester required as starting material in Examples 4 to 6 may be obtained as follows:

(A) 1-bromoisopropylmercaptan 2-molar mixture: To 500 ml. of 40% hydrobromic acid solution there are added dropwise at 20 to 25° C., with stirring, 148 g. of propylene sulfide; the mixture is subsequently stirred for an hour and the reaction mixture is then taken up in 300 ml. of methylene chloride. The methylene chloride solution is separated and washed with water, and the organic phase, after drying over sodium sulfate, is fractionally distilled. 193 g. of 1-bromoisopropylmercaptan of B.P. 44° C./12 mm. Hg are obtained.

(B) Chloromethyl-1-bromoisopropyl thioether 1-molar mixture: 38 g. of paraformaldehyde are suspended in 250 ml. benzene; to this suspension are added 500 ml. of concentrated hydrochloric acid; after stirring for 10 minutes at room temperature, 155 g. of 1-bromoisopropylmercaptan are added dropwise at 40° C. to the mixture, the latter is stirred for 2 hours at 50° C. and the benzene solution is then separated. The organic phase is washed with water, dried over sodium sulfate and fractionally distilled. 159 g. (78% of the theory) of chloromethyl-1-bromoisopropyl thioether of B.P. 80° C./1 mm. Hg are obtained.

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidically effective amount of the active compound for the desired purposes.

It will be appreciated that the instant specification and examples are set forth by way of illustration and not

What is claimed is:

1. Thiol- or thionothiol-phosphoric or -phosphonic acid esters of the formula

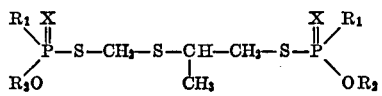

in which

R₁ is an optionally halogen-substituted lower alkyl or alkoxy radical,
R₂ is an optionally halogen-substituted lower alkyl radical, and
X is an oxygen or sulfur atom.

2. Compounds according to claim 1 in which $R_1$ and $R_2$ have from 1 to 4 carbon atoms.

3. Compound according to claim 1, wherein such compound is bis-O,O-dimethyl-thionothiolphosphoric acid ester of hydroxymethyl-thiol-(1-hydroxymethyl)-ethane of the formula

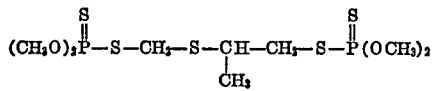

4. Compound according to claim 1, wherein such compound is bis-O,O-diethylthionothiolphosphoric acid ester of hydroxymethyl-thio-(1-hydroxymethyl)-ethane of the formula

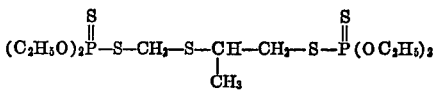

5. Compound according to claim 1, wherein such compound is bis-O,O-diethylthiolphosphoric acid ester of hydroxymethyl-thio-(1-hydroxymethyl)-ethane of the formula

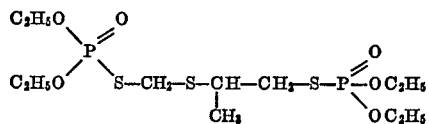

References Cited
UNITED STATES PATENTS

| | | | |
|---|---|---|---|
| 3,075,873 | 1/1963 | Richter | 260—929 X |
| 3,097,997 | 7/1963 | Szabo et al. | 260—929 X |
| 3,100,735 | 8/1963 | Szabo et al. | 260—929 X |

LEWIS GOTTS, Primary Examiner

R. L. RAYMOND, Assistant Examiner

U.S. Cl. X.R.

260—979; 424—205